United States Patent [19]
de Keyzer

[11] 3,963,343
[45] June 15, 1976

[54] CAMMING SYSTEMS

[75] Inventor: Cornelius J. de Keyzer, Venray, Netherlands

[73] Assignee: Rank Xerox, Ltd., London, England

[22] Filed: Oct. 2, 1974

[21] Appl. No.: 511,350

[30] Foreign Application Priority Data
Jan. 7, 1974   Netherlands.................... 7400212

[52] U.S. Cl..................................... 355/8; 355/57; 355/84
[51] Int. Cl.²...................................... G03G 15/28
[58] Field of Search ............... 355/8, 47, 60, 65, 66, 355/84, 81, 57

[56] References Cited
UNITED STATES PATENTS
3,542,467   11/1970   Ferguson et al. ...................... 355/8
3,640,615   2/1972   Schaeffer .............................. 355/8

*Primary Examiner*—R. L. Moses

[57] ABSTRACT

A cam system to drive an oscillating mirror used to keep the movement images projected onto the moving drum of a xerographic reproduction machine in register. The cam system uses a cam, a cam follower, a drive to move the cam follower to and from a start of scan position while in contact with the cam, and a device to rotate the cam about an axis outside the cam. With this arrangement when the cam is adjusted to alter the path of the cam follower, it is rotated about the center of curvature of the cam follower axis during rotation of the cam so that the cam follower always starts its path from the same start of scan position.

6 Claims, 5 Drawing Figures

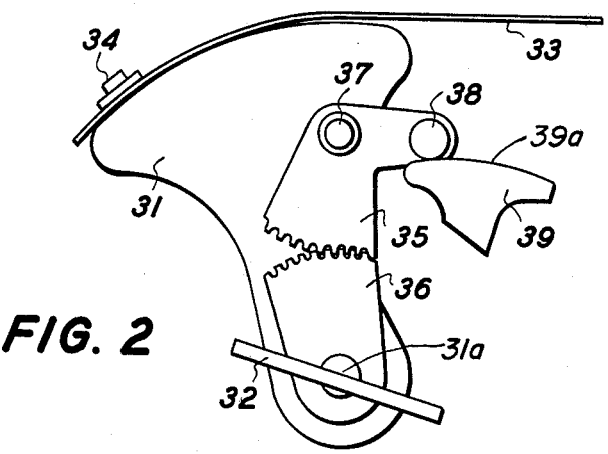
FIG. 2
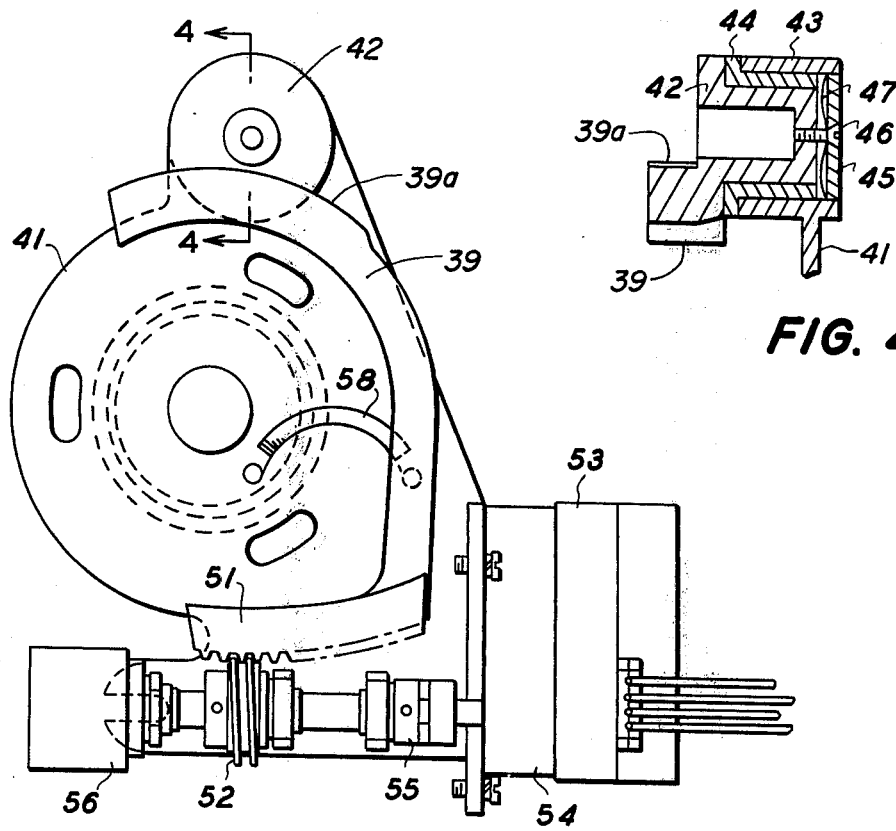
FIG. 3
FIG. 4

CAMMING SYSTEMS

This invention relates to camming systems. Such system include a cam, a cam follower and means for driving the cam follower relative to the cam so that the cam follower follows the shape of a surface of the cam. The path of the cam follower is determined by the shape of the cam surface, and if it is desired to vary this path, it has often been found necessary to substitute a different cam so that the cam follower may follow a different path. Such substitution requires manual dexterity if carried out by hand, or requires a complicated mechanism if carried out by remote control. A system has been proposed in which a plurality of cams are mounted on a turret, and the appropriate cam is brought into engagement with the cam follower as desired.

The invention can be applied to xerographic reproduction machines. The basic principles of xerography are described in British patent specification No. 672,767, and a modern xerographic reproduction machine is described in British patent specification No. 1,122,622. An image from a document is projected via an oscillating mirror, a fixed lens and a fixed mirror onto the surface of a moving drum coated with a photoconductive material which has been given a uniform electrostatic charge so as to form a latent electrostatic image by selective discharge of the drum surface. The oscillation of the mirror and the movement of the drum surface are synchronized so that the projected image is in register with the moving drum surface. The latent electrostatic image is developed by cascading electroscopic toner material over the drum surface carrying the latent electrostatic image, and the developed image is transferred to a sheet of paper which is brought into contact with the drum surface at a transfer station. The drum surface is subsequently cleaned and discharged ready for the next copying cycle. The powder image on the paper is fused into the paper by a fuser and the paper then passes to an output tray.

The drive to the oscillating mirror is by means of a cam. In subsequent machines, it has been possible to alter the magnification of the image projected onto the drum by adjusting the lens system either in position or by varying the number of lenses in the system. The drive to the oscillating mirror must also be adjusted in order to keep the movement of the image projected onto the drum in register with the movement of the drum, and such adjustment involves adjustment of the camming drive system.

British patent specification No. 808,405 discloses a camming system in which portions of the cam are movable either linearly or pivotally in order to change the path of the cam follower. A single cam with adjustable portions is used in this arrangement, rather than substituting one cam for another as described above. The arrangements disclosed in the British patent require a cam to be made up of several different pieces with adjusting mechanisms to control their relative positions.

The present invention avoids the need for a plurality of cams, or for a cam with a plurality of relatively movable components.

According to one aspect of the invention there is provided a camming system comprising a cam, a cam follower having a surface for engagement with the cam which surface has a center of curvature, means to drive the cam follower to and from a start of scan position, and means to rotate said cam about the center of curvature of the cam follower at the start of scan position.

According to another aspect of the invention there is provided a camming system comprising a cam, a cam follower, means to drive the cam follower to and from a start of scan position while in contact with the cam, and means to rotate said cam about an axis outside the cam.

With this arrangement, when the cam is adjusted to alter the path of the cam follower, it is rotated about the center of curvature of the cam follower axis during rotation of the cam so that the cam follower always starts its path from the same start-of-scan position. The subsequent position of the path will, however, depend on the position to which the cam has been rotated about the center of curvature of the cam follower at its start of scan position. The camming system therefore provides an infinite family of paths for the cam follower from a single start of scan position, the family of paths being related by the shape of the cam. If a path for the cam follower is required outside this relationship, then a different cam must be substituted as described above.

An example of the invention will now be described with reference to the accompanying drawings in which:

FIG. 2 is a diagramatic side elevation of a camming system in a start-off scan position and an end-off scan position, FIG. 3 is a more detailed side elevation of part of the apparatus of FIG. 2, FIG. 4 is a section on line 3—3 of FIG. 2

Figure 1:
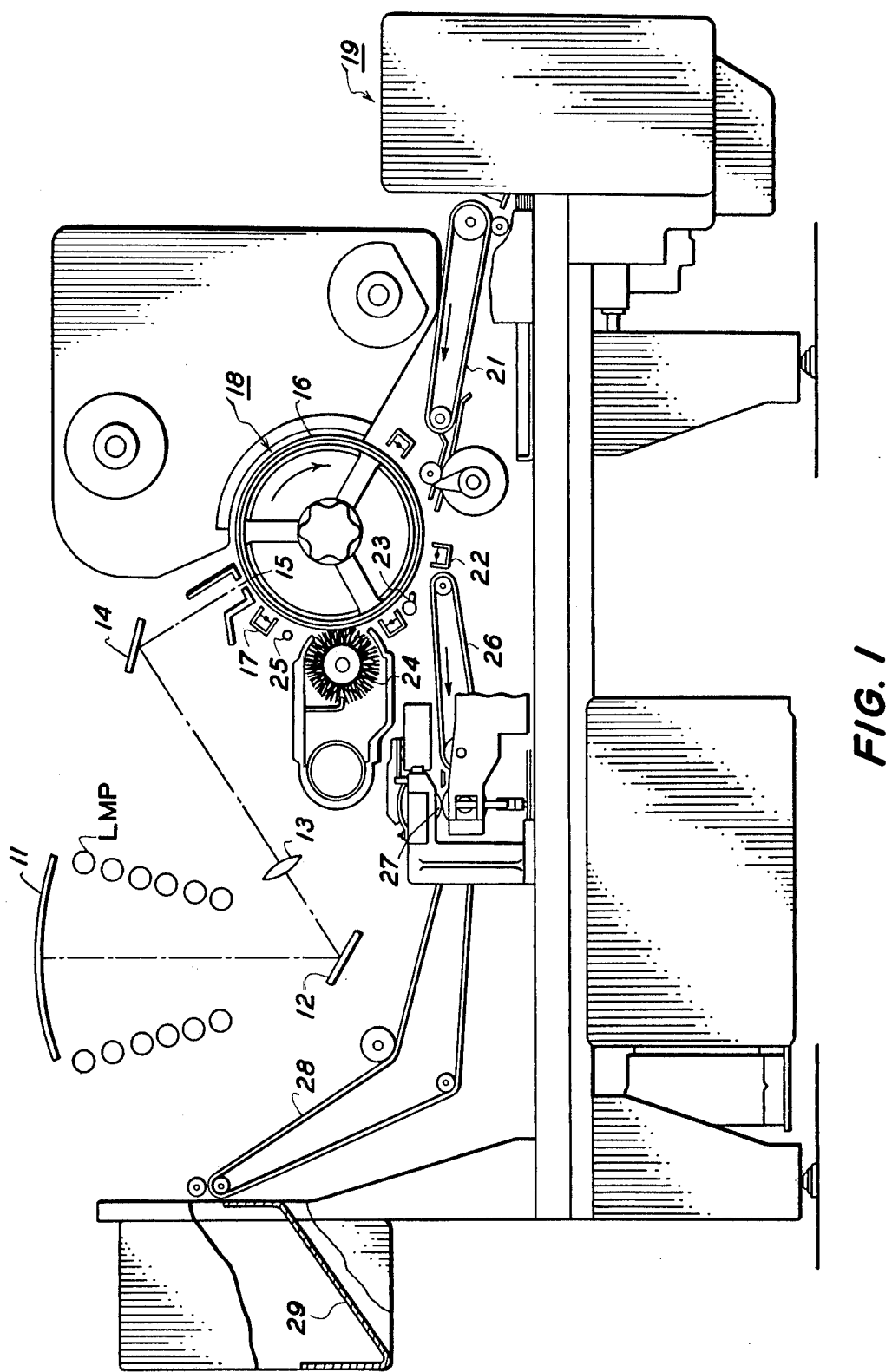
FIG. 1 is a side elevation of a xerographic reproduction machine.

FIG. 1 shows the xerographic reproduction machine of British patent specification No. 1,122,622. A document to be reproduced is placed face downwards on the upper curved surface of a transparent platen 11 and is illuminated by a series of lamps LMP located below the platen. Light reflected from the document is directed by means of an oscillating plane mirror 12, a fixed lens system 13 and a fixed plane mirror 14 and through a slit 15 onto the surface of a xerographic drum 16. Before reaching the slit 15, the drum surface which is of photoconductive material on a conductive backing has been given a uniform electrostatic charge by means of a corona discharge device 17, and the light image projected onto the drum causes selective discharge of the surface so as to form a latent electrostatic image which is developed by cascading charged toner particles over the drum surface to a developing station 18. Sheets of paper from a supply station 19 are fed by vacuum conveyor 21 to a transfer station at the bottom of the drum and the toner particles are caused to transfer onto the paper sheet by a corona discharge device 22. Any toner particles remaining on the drum are removed by further corona discharge devices 23, a cleaning brush 24 and a lamp 25. The paper carrying the transferred toner image passes on a further conveyor 26 to a fuser 27 where a heated roll causes the toner particles to fuse into the paper. The paper then passes on a further conveyor 28 to an output tray 29.

The oscillation of the mirror 12 is achieved by pulling and releasing a tape attached to the surface of a sector so as to oscillate the sector about its axis. The mirror is mounted for rotation with the sector, the axis of the sector passing through the reflecting surface of the mirror.

FIG. 2 shows a similar arrangement, the sector 31 being rotatable about its axis 31a and a scan tape 33 being connected to the curved surface of the sector by a fastening 34, the scan tape passing over the surved surface of the sector and being oscillated by a further camming device not shown. As can be seen from FIG. 2, the sector 31 rotates about its axis 31a as the scan tape 33 is pulled to the right. The drive to the mirror 32 in the arrangement of British patent specification No. 1,112,622 is directly from the sector 31, but in the arrangement of FIG. 2, an indirect drive is provided by means of two toothed quadrants 35 and 36. The quadrant 36 is mounted for rotation about the axis 31a of the sector 31, and the quadrant 35 is coded for rotation about a stub shaft 37 mounted on the sector 31. The sector 35 is provided with a cam follower 38 which engages the surface of a cam 39 which is fixed during scanning of the mirror 12 but which can be adjusted in position to vary the relationship between the oscillation of the mirror 12 and the movement of the tape 33. As can be seen on the two views in FIG. 1, as the tape 33 is moved to the right, the sector 31 rotates about its axis 31a. The quadrant 35 is moved with the sector 31 so that the cam follower 38 moves over the surface of the cam 39 causing the quadrant 35 to rotate about the stub shaft 37. The engagement of the teeth of the quadrants 35 and 36 cause the quadrant 36 to rotate about the axis 31a. In this arrangement, the mirror 32 is mounted for rotation about the axis 31a with the quadrant 36.

When the magnification of the xerographic reproduction machine is altered, a different relationship is required between the movement of the scan tape 33 and the oscillation of the mirror 32, and to achieve this alteration of relationship, the position of the cam 39 is changed. This will cause the mirror 32 to rotate more or less in relation to the movement of the scan tape 33. In order that the mirror 32 should be in the same position at the start of scan position for all positions of the cam 39, the cam 39 must be adjusted in position by rotation about the axis of the cam follower 38. The cam follower 38 is a cylindrical roller, so that although it may rotate when the position of the cam 39 is adjusted at the start of scan position of the apparatus, the axis of the cam follower 38 will not move, so that the scan mirror 32 will remain in the same position during adjustment of the position of the cam 39.

Figure 5:
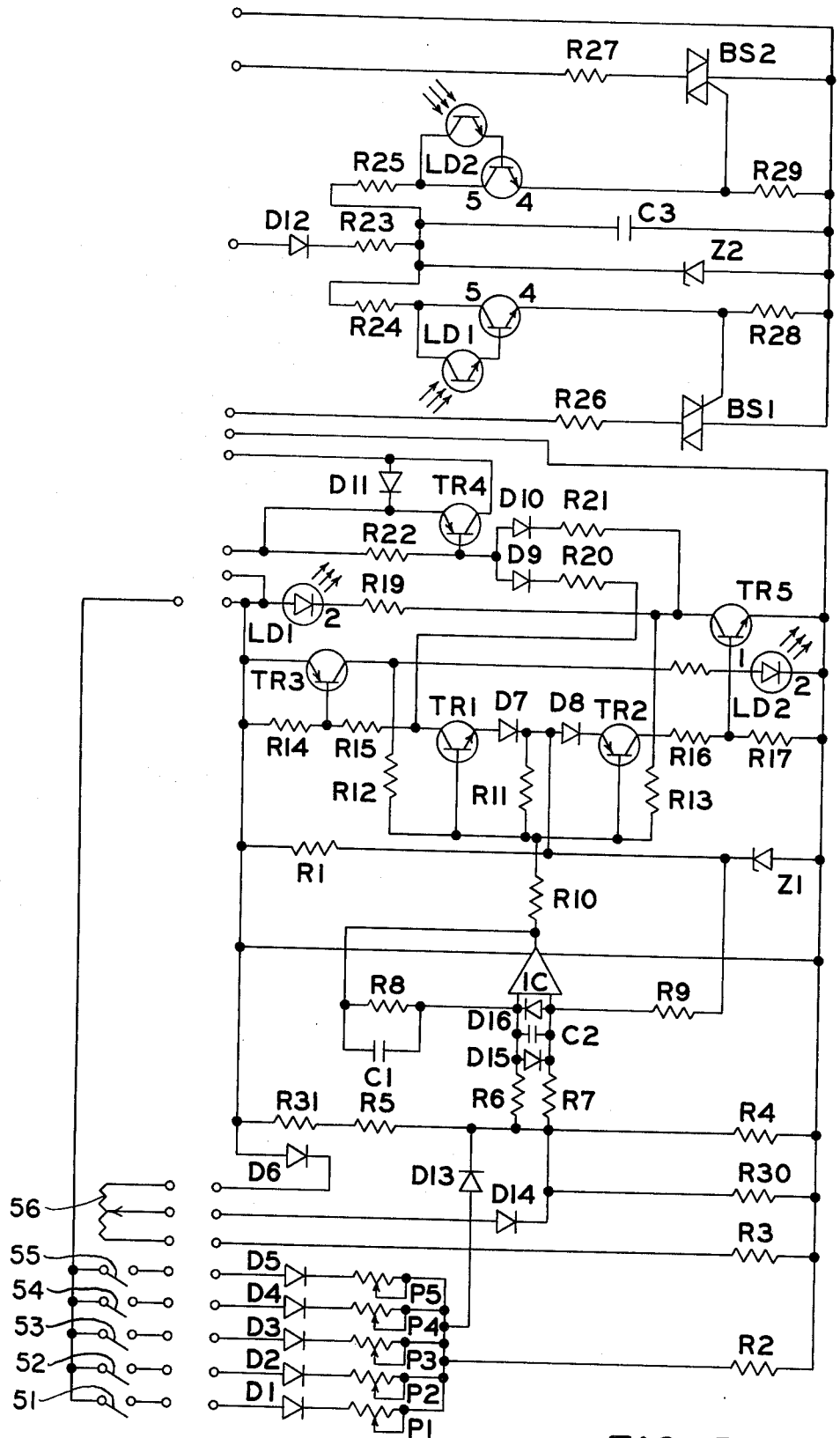
FIG. 5 is a circuit diagram for use with the apparatus of FIGS. 2-4.

FIGS. 3 to 5 show the apparatus for adjusting the position of the cam 39. A roughly circular support plate 41 is provided at its top with a sleeve 43 within which fits a coaxial boss 42. A common axis of the boss 42 and sleeve 43 coincides with the axis of the cam follower 38 at the start of scan position. The cam 39 is suspended from the support plate 41 by the boss 42 fitting in the sleeve portion 43 and being separated therefrom by a bushing 44. The bushing 44 is retained on the boss 42 by a plain washer 45 and a spring 47 by a screw 46 engaging the boss 42 along its axis.

The cam 39 has a camming surface 39a over which the cam follower passes, and a lower arm 51 forming part of a toothed wheel which engages a worm wheel 52. A spring 53 biases the portion 51 in one direction so as to avoid errors in positioning due to backlash between the teeth of the portion 51 and the wheel 52. The wheel 52 is driven by a motor 53 to a gear box 54 and a coupling 55 and a potentiometer 56 is driven with the worm wheel 52.

FIG. 5 shows a bridge circuit for energizing the motor 54 to drive the cam 39 into its selected position. With this circuit, the cam 39 can be driven to any one of five possible positions by closing the corresponding one of five switches S1–S5. Each switch is in a series arm with a diode and a pre-set potentiometer. The five arms are connected in series with a resistor R2 across a fixed voltage. The junction of the pre-set potentiometers and the resistor R2 is connected through a diode D13 and resistor R6 to the input of a comparator. Resistors R4, R5 and R31 form a voltage divider connected to the junction of D13 and R6 and the divider acts with D13 to protect the motor from excessive currents which might be caused by closure of more than one of the switches S1 to S5 at once.

The potentiometer 56 (FIG. 3) is connected in series with a diode D6 and a resistor R3 across the same voltage, and its tap is connected through a diode D14 and a resistor R7 to the other input of the comparator. The comparator compares the value of the resistance on one side of the tap of the potentiometer with the pre-set potentiometer selected by closure of the appropriate switch S1 to S5, and provides an output which is amplified to drive the motor in the appropriate direction so as to move the tap of the potentiometer to achieve a required ratio between the resistances in the two arms of the bridge.

The diodes D1–D6 are required to separate the bridge circuit from the motor drive system. Matching of the temperature characteristics of the circuit is achieved by selection of diodes D6, D14 and resistor R30.

The voltage gain of the first stage of the comparator is determined by resistors R6–R9. The output stages of the comparator include the transistor pairs T1, T3 and T2, T5 and one stage will conduct according to the polarity of the bridge unbalance. The zener diode A1 stabilizes the voltage level between the output stages. The diodes D7 and D8 provide a voltage threshold to introduce a hysteresis required for a stable system of operation. The output stage interface consists of two photocouplers LD1 and LD2.

The synchronous motor is controlled by means of two triacs, whose gate trigger voltage is supplied from a 12 volt source. C3 and Z2 provide a smoothing and stabilizing circuit for the source. The resistors R26 and R27 protect the triac from surge current which might be caused by discharge of the motor capacitor through one of the triacs in the event when both traics are in on condition simultaneously. This might happen when the system switches over from one direction to the other quickly.

The circuit has been described with five switches, allowing the cam 39 to be located in any one of five positions by closing the appropriate switch. Any of these five positions can be changed by adjusting the value of the potentiometer in the series arm with the switch and the diodes D1 to D5. If required, the switches S1 to S5 can be ganged with switches which control the adjustment of the lens system so that the cam 39 is moved to its appropriate position simultaneously with the lens being adjusted or the corresponding change in magnification of the optical system of the xerographic reproduction machine.

Although the camming system has been described in conjunction with a xerographic reproduction machine, it can be applied to any apparatus in which adjustment of the position of a cam is required.

What is claimed is:

1. A xerographic reproduction machine comprising a movable xerographic plate, scanning means for projecting an image of the object to be reproduced onto the xerographic plate, means for varying magnification of the projected image, the scanning means including an oscillatable mirror and a camming system for oscillating said mirror, said camming system comprising a cam, a cam follower, means to drive the cam follower to and from a start of scan position while in contact with the cam, and means to rotate said cam about an axis outside the cam.

2. A xerographic reproduction machine comprising a movable xerographic plate, scanning means for projecting an image of the object to be reproduced onto the xerographic plate, means for varying magnification of the projected image, the scanning means including an oscillatable mirror and a camming system for oscillating said mirror, said camming system comprising a cam, a cam follower, means to drive the cam follower to an from a start of scan position while in contact with the cam, and means to rotate said cam about an axis outside the cam, wherein the axis of rotation of the cam is on the same side of the cam as the cam follower.

3. A xerographic reproduction machine comprising a movable xerographic plate, scanning means for projecting an image of the object to be reproduced onto the xerographic plate, means for varying magnification of the projected image, the scanning means including an oscillatable mirror and a camming system for oscillating said mirror, said camming system comprising a cam, a cam follower having a surface for engagement with the cam which surface has a center of curvature, means to drive the cam follower to and from a start of scan position, and means to rotate said cam about the center of curvature of the cam follower at the start of scan position.

4. A machine as claimed in claim 3 wherein the cam surface engaged by the cam follower during its scanning movement is rotatable about an axis outside said cam.

5. A machine as claimed in claim 3 wherein the drive means comprises a sector rotatable about an axis, a first toothed quadrant rotatable about the same axis, a second toothed quadrant meshing with the first quadrant and rotatable about a shaft located on the sector spaced from its axis, the cam follower being mounted on said second quadrant.

6. A xerographic reproduction machine comprising a movable xerographic plate, scanning means for projecting an image of the object to be reproduced onto the xerographic plate, means for varying magnification of the projected image, the scanning means including an oscillatable mirror and a camming system for oscillating said mirror, said camming system comprising a cam, a cam follower, means to drive the cam follower to and from a start of scan position while in contact with the cam, and means to rotate said cam about an axis outside the cam wherein said means to rotate said cam comprises a motor and a servo system for driving the motor, the servo system including a resistor whose value depends on the actual cam position, a resistor corresponding to each desired position of the cam and a comparator for comparing the actual and desired cam position resistors.

* * * * *